United States Patent [19]
Hayes et al.

[11] Patent Number: 5,187,767
[45] Date of Patent: Feb. 16, 1993

[54] OPTICAL FIBER PROOFTESTER AND METHOD FOR ITS USE

[75] Inventors: Stewart J. Hayes; Laurence R. Noon, both of Saskatoon, Canada

[73] Assignee: Northern Telecom Limited, Montreal, Canada

[21] Appl. No.: 882,718

[22] Filed: May 14, 1992

[51] Int. Cl.⁵ .................................................. G02B 6/36
[52] U.S. Cl. ..................................... 385/137; 385/25; 385/138
[58] Field of Search ................ 385/137, 138, 139, 147, 385/25; 248/49

[56] References Cited

U.S. PATENT DOCUMENTS

| | | | |
|---|---|---|---|
| 4,736,632 | 4/1988 | Case | 385/134 X |
| 4,911,517 | 3/1990 | Newell et al. | 350/96.2 |
| 5,133,033 | 7/1992 | Lukas et al. | 385/137 X |

FOREIGN PATENT DOCUMENTS 0112106  5/1986  Japan ................................. 385/137

Primary Examiner—John D. Lee
Assistant Examiner—Phan Thi Heartney
Attorney, Agent, or Firm—C. W. Junkin

[57] ABSTRACT

An optical fiber prooftester for exerting a controlled tensile force on spliced optical fibers includes a base member, a first optical fiber clamp in the form of a coil spring attached to the base and a sliding member mounted for movement on the base member. A second optical fiber clamp also in the form of a coil spring is fixed to the sliding member. A spliced optical fiber is mounted in the first and second clamps with the splice located between the clamps. A constant force wound spring acting between the base member and the movable member urges the movable member away from the first optical fiber clamp thereby applying a predetermined tensile force upon the splice.

10 Claims, 2 Drawing Sheets

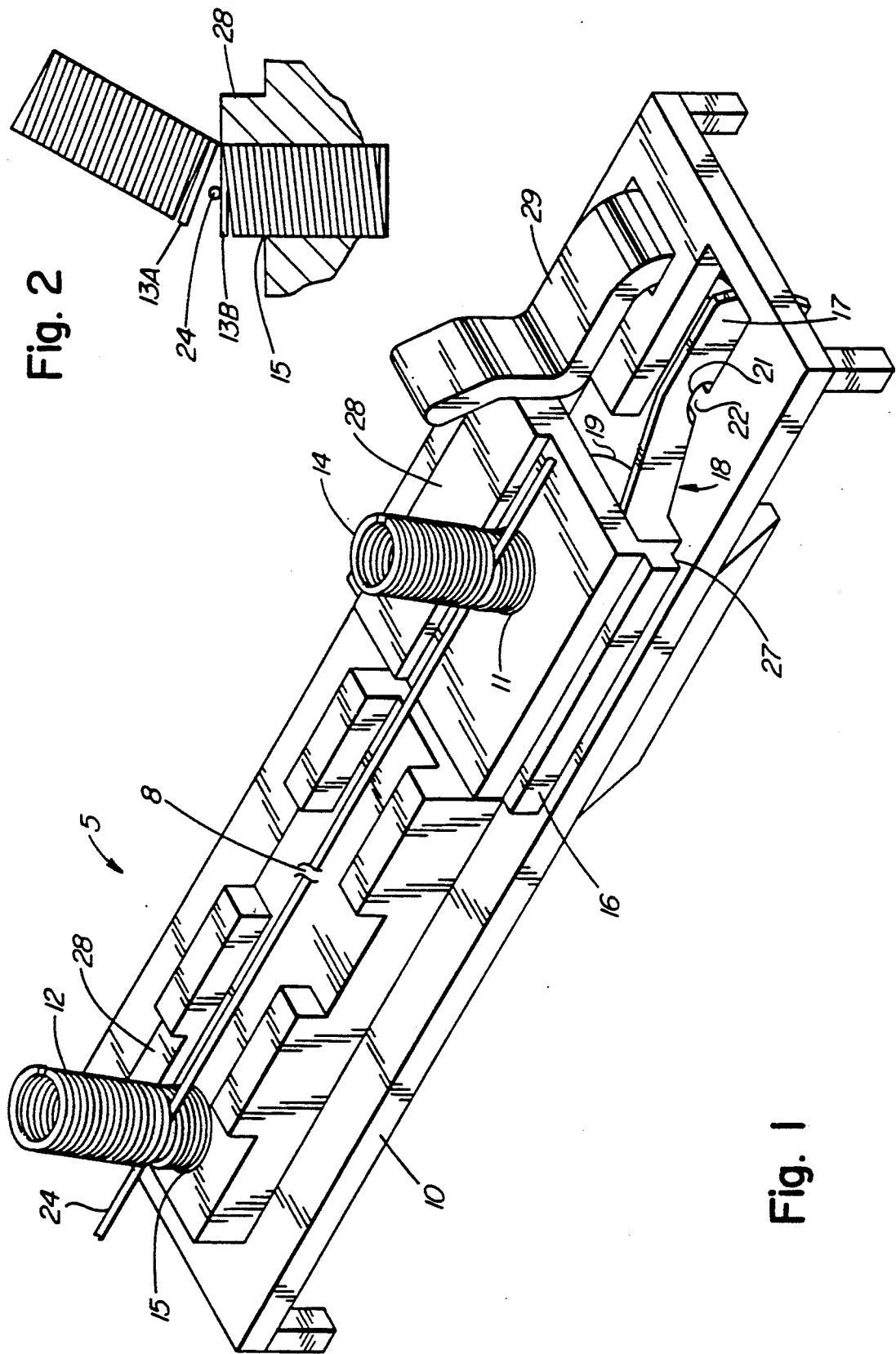

OPTICAL FIBER PROOFTESTER AND METHOD FOR ITS USE

FIELD OF THE INVENTION

The invention relates to methods and devices for testing optical fiber.

BACKGROUND OF THE INVENTION

Over the past decade, several techniques have been used for fusing together optical fibers. Fibers have been fused using an open flame, a heated nichrome wire, lasers, and by the most popular method of using an electric arc to weld fibers together.

Regardless of which technique is used, fibers which are to be joined together must be both held or clamped securely and aligned before a fusion joint is made. A variety of clamping devices are known which are intended to perform this function of holding an optical fiber without marring it. One such device is disclosed in U. S. Pat. No. 4,911,517 issued Mar. 27, 1990 in the name of Newell et al. entitled "Means for Clamping Fiber Optical Cable". The patent discloses a clamp in the form of a clip that is constrained to compress the fiber and grip it securely. The clamp appears to perform its intended function adequately, however it is preferable to have a clamp which is quick to use and which is inexpensive to manufacture.

After optical fibers have been spliced it is often necessary to test the splice by applying a predetermined tensile load to it. The break probability at prooftest, that is, the probability of a joint breaking while under test is greater as the magnitude of the tensile force applied to a spliced joint is increased. The greater the tensile force a splice can withstand, the greater the probability the joint will last without breaking.

A variety of manufacturers have produced prooftesters; for example, Sumitumo Electric Industries of Japan manufactures a Type-35 optical fiber fusion splicer including a prooftester which tests fusion splices with a tensile load of between 50 and 500 grams. This prooftester includes clamps for securely holding two portions of a spliced fiber and a stepper motor which applies tension to the splice by stepwise increasing the distance between the clamps. The force applied by the stepper motor may be adjusted to adjust the tension applied to the splice. Prooftesters which include stepper motors as described tend to be costly, bulky, and somewhat fragile.

SUMMARY OF THE INVENTION

It is an object of the invention to seek to provide a device which is relatively small, lightweight and inexpensive for use in testing an optical fiber.

One aspect of the invention provides a prooftester for exerting a controlled tensile load on an optical fiber. The prooftester comprises a base member; first optical fiber securing means fixed to the base member; a movable member mounted for movement on the base member; second optical fiber securing means fixed to the movable member; and, resilient biasing means acting between the base member and the movable member to urge the movable member away from the first optical fiber securing means.

Another aspect of the invention provides a method for securing an optical fiber to a base member. The method comprises the steps of providing a helical extension spring fixed to a base member, the spring comprising a plurality of coils and having a rest condition in which adjacent coils of the spring contact on another; separating at least two respective portions of the spring by bending the spring at a predetermined point; inserting an optical fiber between the separated portions of the adjacent coils; and allowing the spring to return toward its rest condition so that the separated portions of the adjacent coils engage and grip the fiber.

Another aspect cf the invention provides an apparatus for securing an optical fiber to a base member. The apparatus comprises a base member, and a helical extension spring fixed to the base member. The spring comprises a plurality of coils and has a rest condition in which adjacent coils of the spring contact one another, some of the coils being movable with respect to the base member to separate at least two respective portions of two adjacent coils of the spring for insertion of an optical fiber therebetween so that the separated portions of the adjacent coils engage and grip the fiber when the spring is allowed to return to its rest condition. A bending formation meeting the base member is located to one side of the spring. A free end of the spring protruding from the base member extends beyond the bending formation so that lateral force exerted on the free end of the spring in the direction of the bending formation bends the spring over the bending formation to separate respective portions of two predetermined adjacent coils of the spring.

Such factors as length, diameter and initial tension must be prudently determined if a spring is to be used as a clamp for an optical fiber. While it is desirable to provide a clamp which securely holds a fiber in a preferred position, it is also desirable to have a clamp which does not exert too much compression on the fiber, thereby unduly stressing or damaging the glass fiber or the acrylate coating protecting the fiber. It is preferable to have a spring clamp which is relatively easy for an operator to repeatedly clamp and unclamp. An operator s fingers would probably become prematurely fatigued if the spring required an excessive amount of force to bend.

DESCRIPTION OF THE DRAWINGS

Figure 3:
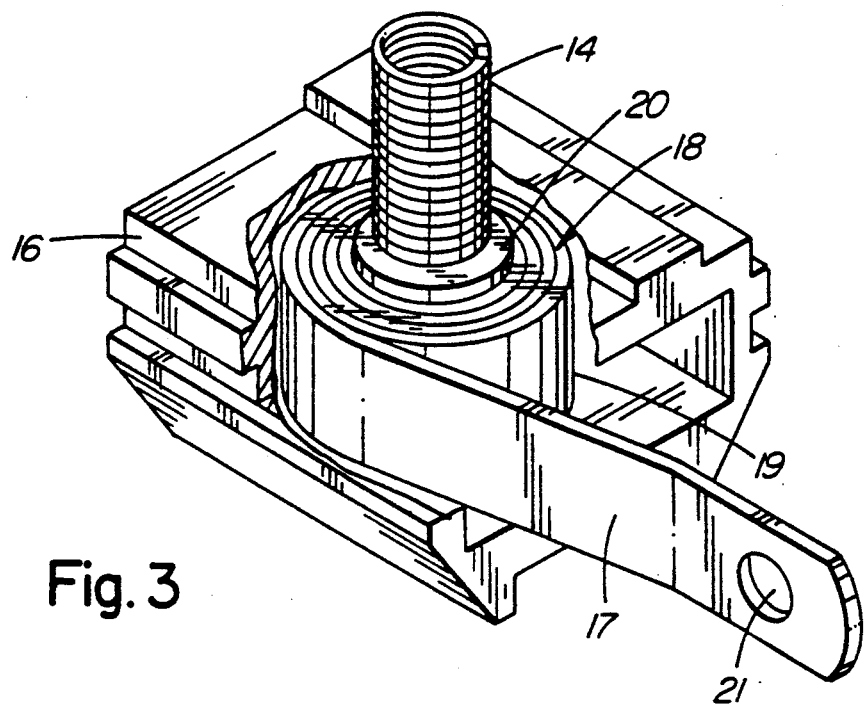
FIG. 3 is an oblique broken away view of a constant force wound spring of the prooftester of FIG. 1 wound around a race of ball bearings which are mounted over an extension spring housed within a slider.

Embodiments of the invention by way of example will be described in conjunction with the drawings in which:

FIG. 1 is an obique view of a prooftester with a spliced length of optical fiber under test;

FIG. 2 is a side view partly in cross section of an extension spring clamp assembly of the prooftester of FIG. 1, with the extension spring bent and having a piece of fiber in position ready for clamping;

In FIG. 1 an optical fiber prooftester 5 is shown having an elongate base member 10 and a movable member in the form of a slider 16. The base member 10 has a rail 27 upon which the slider 16 is mounted for sliding movement. The prooftester 5 also has first and second fiber securing means in the form of helical extension springs 12 and 14. Each spring 12, 14 is formed of steel die wire having a square cross-section. The springs 12 and 14 shown in FIG. 1 have approximately 45 to 50 tight wound turns of wire of 0.022 inch square cross-section. The springs 12 and 14 in an unextended rest condition are approximately 1 inch in length. Each spring 12, 14 has a rest condition in which adjacent coils contact ore another. A residual or initial tension of approximately 200 to 300 grams of tension is required to separate adjacent coils. The first spring 12 has one end held captive in a complementary recess 15 of the base member 10 to fix it to the base member 10. The base member 10 includes a bending formation in the form of a post 28 located next to the first spring 12; the first spring 12 has a free end protruding from the base member 10 beyond an upper surface of the post 28. The second spring 14 protrudes through a complementary aperture 11 in the slider 16 to fix it to the slider 16. The slider 16 also includes a bending formation in the form of a post 28 located next to the spring 14 mounted within the slider. Another end of the second spring 14 protrudes below the aperture 11 through bearing means in the form of a race of ball bearings 20 as shown in FIG. 3 and then through a bottom aperture (not shown) in the slider 16. A constant force wound spring 18 has a wound end 19 fixed around the race of ball bearings and a free end 17 extending from the slider 16 away from the first spring. The wound end 19 of the wound spring 18 rotates about a longitudinal axis of the spring 14 on the race of ball bearings 20. The free end 17 of the wound spring 18 has a hole 21 which fits over a projection 22 of the base member 10 to secure the free end 17 to the base member 10. The wound spring 18 resiliently biases the slider 16 away from the first helical spring 12 with a force of approximately 350 grams. Alternatively, if it were necessary to place a splice under a more or less rigorous test, a constant force wound spring having more or less force could be used.

Figure 4:
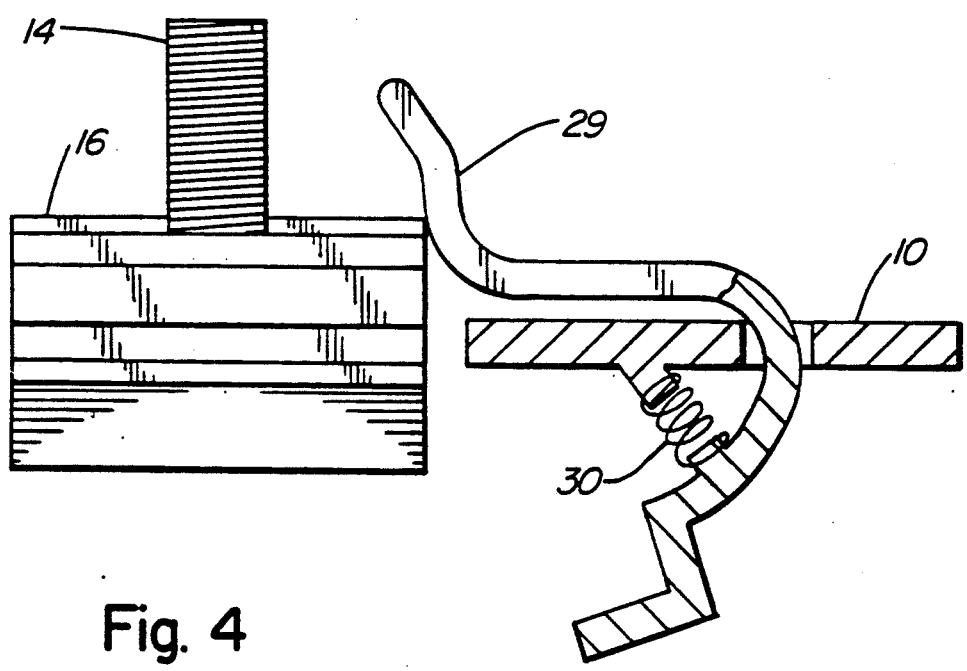
FIG. 4 is a cross-sectional side view of a releasable holding means partially shown in FIG. 1.

In FIG. 4 holding means in the form of a biased lever 29 is shown. A compression spring 30 normally biases a portion of the lever 29 against the slider 16 which forces the slider to slide toward the first spring 12 with a force of greater than 350 grams. At the same time, the constant force wound spring 18 biases the slider 16 in an opposite direction away from the first spring 12. The compression spring 30 must apply a greater force in one direction on the slider than the force applied in another opposite direction by the constant force wound spring 18 so that the constant force wound spring 18 will normally be extended and under tension. When an operator counteracts the force of the compression spring 30 by pushing against the biased lever 29 in a direction away from the slider 16, the constant force wound spring's 350 gram force 18 will be applied to a fiber under test.

The operation of clamping an optical fiber between either of the springs 12 and 14 is similar and will be described with reference to one of the springs in conjunction with FIG. 2. The free end of the helical spring 12 is urged laterally over its respective post 28 to bend the spring at a predetermined point and separate respective portions of two adjacent coils 13a, 13b. The fiber is inserted between the separated coils from the side of the spring opposite the post 28 and the free end of the spring is released to permit the spring to return toward a rest condition. As the spring closes on the fiber and adjacent coils engage to grip the fiber the spring exerts a nominal clamping pressure of approximately 8.2 MPa +/− 40% on the fiber.

After the fiber is clamped in both springs 12 and 14 at locations spaced on opposite sides of a splice 8 and with no slack in the fiber between the springs 12 and 14 the lever 29 shown in FIG. 4 is forced to the right by the operator and the constant force wound spring 18 acts between the base member 10 and the slider 16 to urge the slider 16 away from the first helical spring 12 thereby exerting a controlled tensile load of approximately 350 grams on the optical fiber and the splice held between the helical spring clamps 12 and 14. If the splice 8 does not break under the applied tensile load, the probability that it will not break under tensile loads during installation and field use is acceptable. If the splice 8 fails, the fiber ends are reprepared and the splice is remade and retested.

The helical extension spring clamps 12 and 14 described are simple to use and inexpensive optical fiber clamps. They provide an adequate fiber clamping pressure of 8.2 MPa +/−40% on the fiber while requiring only a lateral force of 200 grams at their free ends for opening. This opening force is easily applied by an operator over a long shift without fatigue.

Advantageously, the bending post 28 provides a predetermined bending point remote from the location where springs 12, 14 enter the base member 10 or the slider 16, thereby ensuring that there is no scissor action between the springs and the base member 10 or slider 16 on allowing the springs to close on the fiber. The bending post 28 located at one side of the springs 12, 14 prevents a piece of fiber inserted between adjacent spring coils from being drawn into the hole in which the spring is mounted. Therefore, the bending post 28 must not completely surround the spring. If the fiber is drawn down slightly as the spring closes upon it, the unclamped portions of the fiber extending outward from the spring should not be impeded by the bending post 28 or by the surface of the base member 10 adjacent the hole in which the spring is mounted as this would cause the unwanted scissor action upon the fiber. Such a scissor action could harm fiber.

Flat clamping surfaces of the helical springs 12, 14 spread the clamping load along the length of the fiber being clamped to reduce damage to the fiber and its coating. A helical spring formed of wire of round cross-section would apply clamping force over a more limited contact region than a spring formed of wire of square cross section. If a round cross-section wire were to be used to form a spring, careful spring design and control would be required to ensure that clamping forces do not cause unacceptable fiber damage while providing adequate fiber retention. As an alternative to a spring formed of wire having a square cross-section an extension spring having $ wire with flat upper and lower surfaces and rounded sides can be used or alternatively a wire of rectangular cross section can be used.

The constant force wound spring 18 advantageously provides relatively constant and controlled tensile force for prooftesting in a very simple, lightweight, inexpensive and reliable construction. Furthermore the constant force wound spring prooftester 5 can be much simpler, less expensive to manufacture, lighter weight and more robust than prooftesters requiring stepper motors and power supplies. The prooftester 5 may be used for testing mechanical splices in field locations where power is not readily available for the splicing process.

Numerous other modifications and variations may be considered without departing from the scope of the invention.

What is claimed is:

1. An optical fiber prooftester for exerting a controlled tensile load on an optical fiber, the prooftester comprising:
   a base member;
   first optical fiber securing means fixed to the base member;
   a movable member mounted for movement on the base member;
   second optical fiber securing means fixed to the movable member; and
   a constant force wound spring acting between the base member and the movable member to urge the movable member away from the first optical fiber securing means.

2. An optical fiber prooftester as defined in claim 1, further comprising holding means for holding the movable member in a first position relatively close to the first optical fiber securing means against the urging of the constant force wound spring, the holding means being releasable to permit movement of the moveable member away from the first optical fiber securing means by the constant force wound spring.

3. An optical fiber prooftester as defined in claim 1, wherein the first and second optical fiber securing means each comprise a helical extension spring comprising a plurality of coils and having a rest condition in which adjacent coils of the spring contact one another, some of the coils being movable with respect to the base member to separate at least two respective portions of two adjacent coils of the spring for insertion of an optical fiber therebetween so that the separated portions of the adjacent coils engage and grip the fiber when the spring is allowed to return toward its rest condition.

4. An optical fiber prooftester as defined in claim 1, wherein the constant force wound spring has a free end fixed to one of the base member and the movable member and a wound end mounted for rotation about a fixed axis to the other of the base member and the movable member.

5. An optical fiber prooftester as defined in claim 4, wherein the first and second fiber securing means each comprise helical coil springs and the constant force wound spring is mounted for rotation about a longitudinal axis of one of the helical coil springs.

6. An optical fiber prooftester as defined in claim 2, wherein the holding means comprises:
   a lever pivotably mounted to the base member, and
   resilient biasing means acting between the base member and the lever to bias the lever against the movable member to hold the movable member in the first position against the urging of the constant force wound spring,
   the lever being pivotable by operator-applied pressure to permit movement of the movable member by the constant force wound spring.

7. A method for securing an optical fiber to a base member, the method comprising:
   providing a helical extension spring fixed to a base member, the spring comprising a plurality of coils and having a rest condition in which adjacent coils of the spring contact one another;
   separating at least two respective portions of the spring by bending the spring at a predetermined point;
   inserting an optical fiber between the separated portions of the adjacent coils; and
   allowing the spring to return toward its rest condition so that the separated portions of the adjacent coils engage and grip the fiber.

8. A method as defined in claim 7, wherein the spring is bent at the predetermined point by bending the spring over a bending formation at one side of the spring.

9. A method as defined in claim 8, wherein the spring exerts a pressure of 8.2 MPa $+/-40\%$ on the fiber when gripping the fiber.

10. An apparatus for securing an optical fiber to a base member, comprising a base member and a helical extension spring fixed to the base member, the base member having a bending formation to one side of the spring, the spring comprising a plurality of coils and having a rest condition in which adjacent coils of the spring contact one another, the spring having a free end protruding from the base and extending beyond the bending formation so that lateral force exerted on the free end of the spring in the direction of the bending formation bends the spring over the bending formation to separate respective portions of two predetermined adjacent coils of the spring for insertion of an optical fiber therebetween so that the separated portions of the adjacent coils engage and grip the fiber when the spring is allowed to return toward its rest condition.

* * * * *